US011335304B2

(12) United States Patent
Lei et al.

(10) Patent No.: US 11,335,304 B2
(45) Date of Patent: May 17, 2022

(54) DRIVING CIRCUIT FOR HEAD-WORN DISPLAY DEVICE, AND VIRTUAL REALITY DISPLAY DEVICE

(71) Applicants: Beijing BOE Optoelectronics Technology Co., Ltd., Beijing (CN); BOE Technology Group Co., Ltd., Beijing (CN)

(72) Inventors: Yu Lei, Beijing (CN); Hao Zhang, Beijing (CN); Lili Chen, Beijing (CN); Peng Han, Beijing (CN); Yuanjie Lu, Beijing (CN); Huidong He, Beijing (CN); Yukun Sun, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 134 days.

(21) Appl. No.: 16/699,845

(22) Filed: Dec. 2, 2019

(65) Prior Publication Data

US 2020/0211513 A1 Jul. 2, 2020

(30) Foreign Application Priority Data

Jan. 2, 2019 (CN) .......................... 201910002455.X (51) Int. Cl.
*G09G 5/38* (2006.01)
*G06F 3/01* (2006.01)
(52) U.S. Cl.
CPC ............... *G09G 5/38* (2013.01); *G06F 3/012* (2013.01); *G09G 2320/0261* (2013.01); *G09G 2354/00* (2013.01)

(58) Field of Classification Search
None
See application file for complete search history.

(56) References Cited

U.S. PATENT DOCUMENTS

2008/0200760 A1\* 8/2008 Minai .................... A61B 5/062
600/117
2012/0070137 A1\* 3/2012 Watanabe .............. G01C 17/38
396/50

(Continued)

FOREIGN PATENT DOCUMENTS

CN 104898826 A 9/2015
CN 105044915 A 11/2015

(Continued)

OTHER PUBLICATIONS

Chinese Office Action for corresponding application 201910002455.X dated Aug. 3, 2020.

(Continued)

*Primary Examiner* — Jwalant Amin
(74) *Attorney, Agent, or Firm* — ArentFox Schiff LLP; Michael Fainberg (57) ABSTRACT

A driving circuit for head-worn display device, and a virtual reality display device, and the driving circuit includes: a display panel driving circuit, the display panel driving circuit comprises a sensor circuit, and a data processing circuit; the sensor circuit is configured to generate a posture information signal corresponding to a rotation direction of the display panel; and the data processing circuit is configured to receive the posture information signal and a display data signal for a display panel, and to control the display panel according to the posture information signal and the display data signal to display an image corresponding to a rotation direction.

14 Claims, 4 Drawing Sheets

(56) References Cited

U.S. PATENT DOCUMENTS

| | | | |
|---|---|---|---|
| 2015/0078653 A1* | 3/2015 | Tafazoli Bilandi | ........................ G06K 9/00201 382/154 |
| 2016/0033768 A1* | 2/2016 | Pedrotti | ............. G02B 27/0101 345/8 |
| 2017/0036111 A1* | 2/2017 | Shigeta | ................ H04N 13/376 |
| 2018/0107266 A1 | 4/2018 | Ma | |
| 2018/0253868 A1* | 9/2018 | Bratt | ........................ G06F 3/012 |
| 2019/0027120 A1* | 1/2019 | Croxford | ................ G09G 3/001 |
| 2021/0110767 A1* | 4/2021 | Wang | ................ G09G 3/3266 |

FOREIGN PATENT DOCUMENTS

| | | |
|---|---|---|
| CN | 106547352 A | 3/2017 |
| CN | 107204044 A | 9/2017 |
| CN | 206991241 U | 2/2018 |

OTHER PUBLICATIONS

Chinese Office Action for corresponding application 201910002455.X dated Nov. 27, 2019.

* cited by examiner

DRIVING CIRCUIT FOR HEAD-WORN DISPLAY DEVICE, AND VIRTUAL REALITY DISPLAY DEVICE

CROSS-REFERENCE TO RELATED APPLICATION

This application claims priority of Chinese Patent Application No. 201910002455.X, filed on Jan. 2, 2019, which is hereby incorporated by reference in its entirety.

FIELD

The present disclosure relates to the field of display technologies, and particularly to a driving circuit for head-worn display device, and a virtual reality display device.

BACKGROUND

The Virtual Reality (VR) technology relates to a computer simulation system for creating and experiencing a virtual world, where the system creates a simulative environment using a computer so that a user can be immersed in the environment by integrating a number of information sources, and involving interactive 3D dynamic views and physical behaviors.

SUMMARY

An embodiment of the disclosure provides a driving circuit for head-worn display device including: a display panel driving circuit, the display panel driving circuit comprises a sensor circuit, and a data processing circuit;

the sensor circuit is configured to generate a posture information signal corresponding to a rotation direction of the display panel; and the data processing circuit is configured to receive the posture information signal and a display data signal for a display panel, and to control the display panel according to the posture information signal and the display data signal to display an image corresponding to a rotation direction.

Optionally in some embodiments of the disclosure, the sensor circuit includes a geomagnetic sensor, a signal processing circuit, and a register, wherein:

the geomagnetic sensor is configured to measure a magnetic field offset of the head-worn display device;

the signal processing circuit is configured to convert the magnetic field offset measured by the geomagnetic sensor into the posture information signal in a format corresponding to the register, and to provide the register with the posture information signal; and the register is configured to store the posture information signal output by the signal processing circuit.

Optionally in some embodiments of the disclosure, the signal processing circuit includes an electric signal acquiring circuit, an analog to digital converting circuit, and a first encoding circuit, wherein:

the electric signal acquiring circuit is configured to convert the magnetic field offset measured by the geomagnetic sensor into an analog voltage electric signal;

the analog to digital converting circuit is configured to convert the analog voltage electric signal into a digital voltage signal; and the encoding circuit is configured to encode the digital voltage signal as the posture information signal, and to provide the register with the posture information signal.

Optionally in some embodiments of the disclosure, the geomagnetic sensor includes a magneto-resistance effect sensor, a Hall effect sensor, or a magnetic flux sensor.

Optionally in some embodiments of the disclosure, the driving circuit further includes a data conversion circuit configured to read the posture information signal stored by the register and convert the posture information into a posture data signal and provide the posture data signal to the data processing circuit.

Optionally in some embodiments of the disclosure, the data processing circuit further comprises a data synchronization circuit configured to synchronize the posture data signal with the display data signal for driving the display panel and output a first display data signal;

a data transmission circuit configured to provide the first display data signal to the display panel;

a display driving circuit configured to drive the display panel to display the first display data signal.

Optionally in some embodiments of the disclosure, the data processing circuit includes a display driving integrated circuit.

Optionally in some embodiments of the disclosure, the data processing circuit includes a second encoding circuit configured to receive the posture information signal generated by the sensor circuit, and to convert the posture information signal into a posture information signal in a format corresponding to the display driving integrated circuit, and to provide the display driving integrated circuit with the posture information signal.

Optionally in some embodiments of the disclosure, driving circuit further includes a master processor configured to output the display data signal to the data processing circuit.

An embodiment of the disclosure further provides a virtual reality display device including a master processor, and the driving circuit for head-worn display device according to any one of the solutions above, communicatively connected with the master processor, wherein:

the master processor is configured to output the display data signal to the data processing circuit.

Optionally in some embodiments of the disclosure, the master processor transmits data with the driving circuit for head-worn display device in a wired or wireless manner.

Optionally in some embodiments of the disclosure, the sensor circuit includes a geomagnetic sensor, a signal processing circuit, and a register, wherein:

the geomagnetic sensor is configured to measure a magnetic field offset of the head-worn display device;

the signal processing circuit is configured to convert the magnetic field offset measured by the geomagnetic sensor into the posture information signal in a format corresponding to the register, and to provide the register with the posture information signal; and the register is configured to store the posture information signal output by the signal processing circuit.

Optionally in some embodiments of the disclosure, the signal processing circuit includes an electric signal acquiring circuit, an analog to digital converting circuit, and a first encoding circuit, wherein:

the electric signal acquiring circuit is configured to convert the magnetic field offset measured by the geomagnetic sensor into an analog voltage electric signal;

the analog to digital converting circuit is configured to convert the analog voltage electric signal into a digital voltage signal; and the encoding circuit is configured to encode the digital voltage signal as the posture information signal, and to provide the register with the posture information signal.

Optionally in some embodiments of the disclosure, the geomagnetic sensor includes a magneto-resistance effect sensor, a Hall effect sensor, or a magnetic flux sensor.

Optionally in some embodiments of the disclosure, the driving circuit further includes a data conversion circuit configured to read the posture information signal stored by the register and convert the posture information into a posture data signal and provide the posture data signal to the data processing circuit.

Optionally in some embodiments of the disclosure, the data processing circuit further comprises a data synchronization circuit configured to synchronize the posture data signal with the display data signal for driving the display panel and output a first display data signal;

a data transmission circuit configured to provide the first display data signal to the display panel;

a display driving circuit configured to drive the display panel to display the first display data signal.

Optionally in some embodiments of the disclosure, the data processing circuit includes a display driving integrated circuit.

Optionally in some embodiments of the disclosure, the data processing circuit further includes a second encoding circuit configured to receive the posture information signal generated by the sensor circuit, and to convert the posture information signal into a posture information signal in a format corresponding to the display driving integrated circuit, and to provide the display driving integrated circuit with the posture information signal.

DETAILED DESCRIPTION OF THE EMBODIMENTS

In order to make the objects, technical solutions, and advantages of the disclosure more apparent, particular implementations of the head-worn display device, the method for driving the same, and the virtual reality display device according to the embodiments of the disclosure will be described below in details with reference to the drawings. It shall be appreciated that the preferable embodiments to be described below are only intended to illustrate and explain the disclosure, but not intended to limit the disclosure thereto. The embodiments of the disclosure, and the features in the embodiments can be combined with each other unless they conflict with each other. It shall be noted that the components in the drawings are not intended to reflect any real proportion, but only intended to illustrate the disclosure of the disclosure. Like or similar reference numerals throughout the drawings will refer to like or similar elements, or elements with like or similar functions.

At present the performance of a VR device generally depends upon a latency, and the latency in the VR device refers to a motion-to-photon latency, where the motion represents an instance of time when user motion starts, and the photon represents an instance of time when a corresponding image is displayed on a screen, so the motion-to-photon latency represents a period of time from the start of the user motion to the displaying of the corresponding image on the screen. If a latency of a VR device is more than 20 ms, then a user will tend to get light-headed while operating on the VR device.

Figure 1:
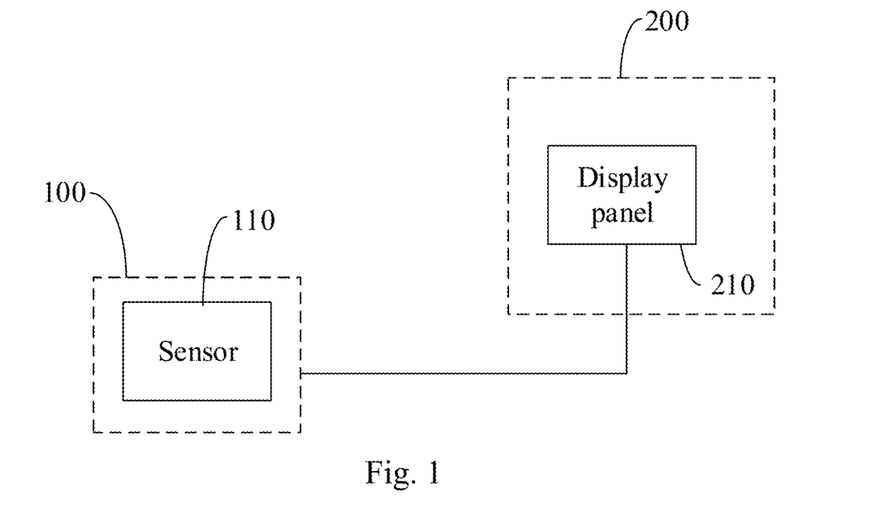
FIG. 1 is a schematic structural diagram of a head-worn display device in the related art.

As illustrated in FIG. 1, a VR device generally includes a master processor 100, and a head-worn display device 200 communicating with the master processor 100, where the master processor 100 includes a sensor 110 in addition to a master processing integrated circuit to acquire posture information of the head-worn display device 200 through the sensor 110. The master processor 100 processes an image according to the posture information of the head-worn display device 200 acquired by the sensor 110, and provides the head-worn display device 200 with the processed image so that the image is displayed on a display panel 210 in the head-worn display device 200.

Generally the master processor 100 is arranged separate from the display panel 210 in the head-worn display device 200 so that the master processor 100 shall provide the display panel 210 in the head-worn display device 200 with the processed image on a data line (e.g., a data line complying with the Mobile Industry Processor Interface (MIPI) protocol) so that the image is displayed on the display panel 210. This process takes approximately three seconds. Hereupon an embodiment of the disclosure provides a head-worn display device so as to shorten a latency arising from signal transmission, and to improve an experience of a user.

Figure 2:
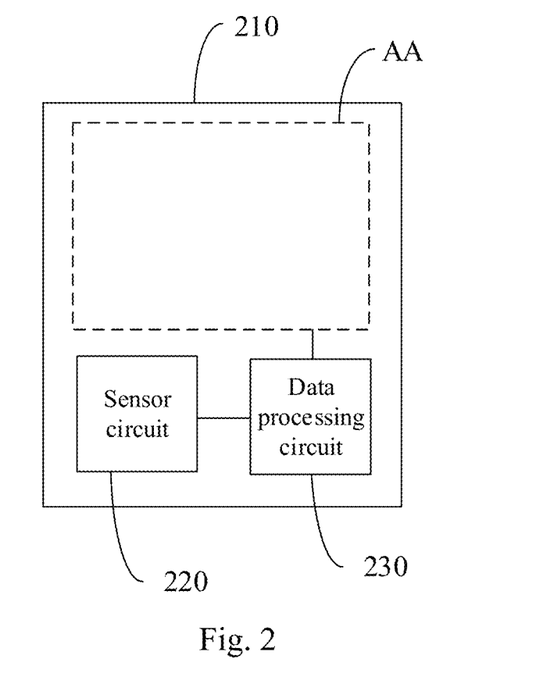
FIG. 2 is a schematic structural diagram of a head-worn display device according to an embodiment of the disclosure.

An embodiment of the disclosure provides a head-worn display device as illustrated in FIG. 2, which can include a display panel 210, a sensor circuit 220, and a data processing circuit 230, where the sensor circuit 220 and the data processing circuit 230 are integrated on the display panel 210, and the display panel 210 includes a display area AA and a non-display area. The sensor circuit 220 and the data processing circuit 230 can be integrated in the non-display area of the display panel 210, or the sensor circuit 220 and the data processing circuit 230 can be integrated on the backside of the display panel 210, although some embodiments of the disclosure will not be limited thereto.

Furthermore the sensor circuit 220 is configured to generate a posture information signal corresponding to a rotation direction of the display panel 210. The data processing circuit 230 is configured to receive the posture information signal and a display data signal, and to control the display panel 210 according to the posture information signal and the display data signal to display an image corresponding to the rotation direction.

The head-worn display device according to some embodiments of the disclosure includes a display panel, a sensor circuit configured to generate a posture information signal corresponding to a rotation direction of the display panel, and a data processing circuit configured to receive the posture information signal and a display data signal, and to control the display panel according to the posture information signal and the display data signal to display an image corresponding to the rotation direction. Since the sensor circuit is integrated on the display panel, the sensor circuit can generate the posture information signal corresponding to the rotation direction of the display panel in a timelier manner. Furthermore the data processing circuit is integrated on the display panel, and can control the display panel directly to display the image to thereby shorten a period of time for the master processor to transmit the signal to the display panel, and thus a latency arising from signal transmission, so as to make the image displayed on the display panel in more synchronization with the rotation direction, thus improving an experience of a user.

Figure 3:
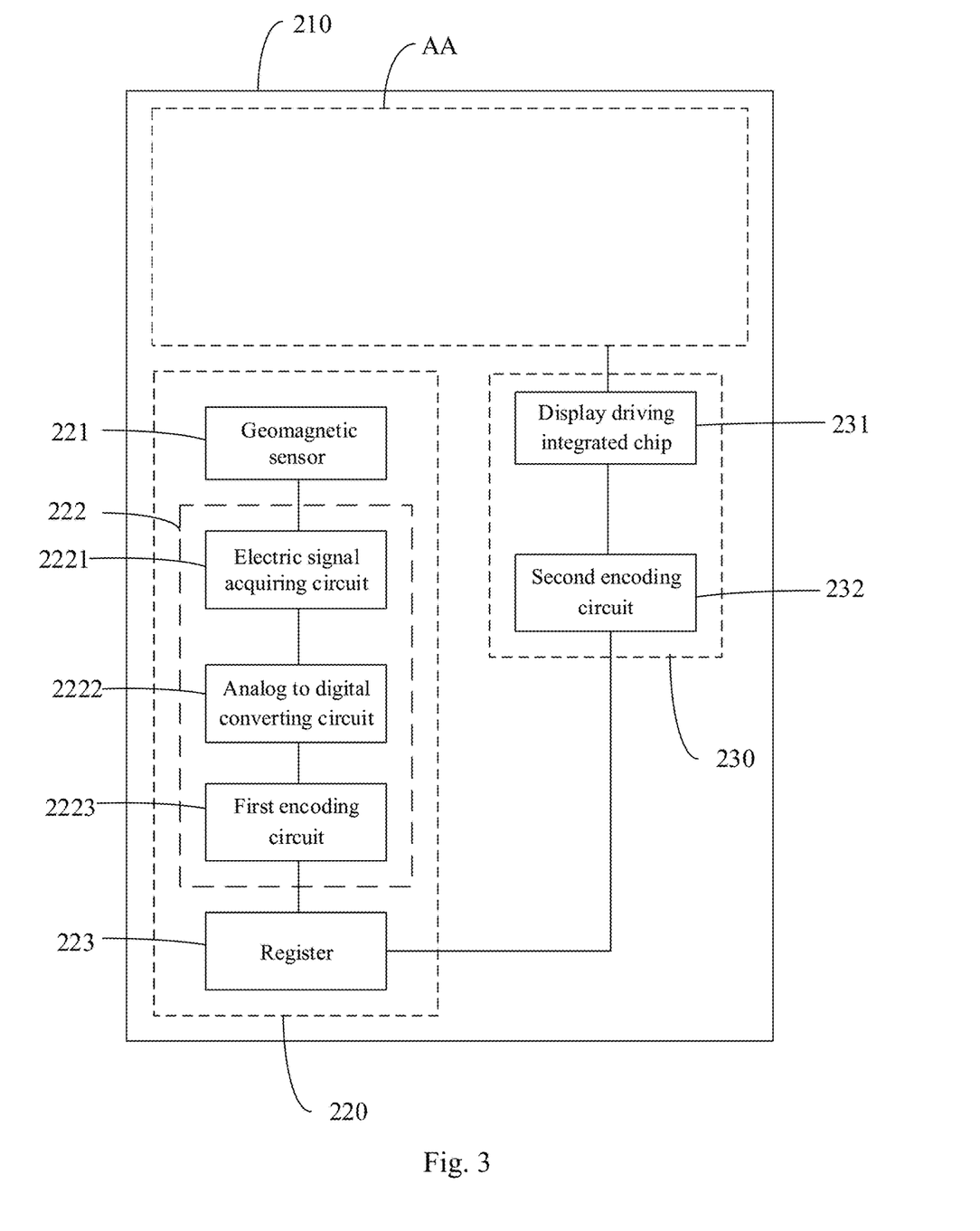
FIG. 3 is a schematic structural diagram in details of the head-worn display device according to an embodiment of the disclosure.

In a particular implementation, in some embodiments of the disclosure, as illustrated in FIG. 3, the sensor circuit 220 can include a geomagnetic sensor, a signal processing circuit 222, and a register 223.

The geomagnetic sensor 221 is configured to measure a magnetic field offset of the head-worn display device.

The signal processing circuit 222 is configured to convert the magnetic field offset measured by the geomagnetic sensor 221 into the posture information signal in a format corresponding to the register 223, and to provide the register 223 with the posture information signal.

The register 223 is configured to store the posture information signal output by the signal processing circuit 222.

Generally a parameter stored in the register can be set in a binary or hexadecimal pattern, so the signal processing circuit can convert a data format of the magnetic field offset of the head-worn display device measured by the geomagnetic sensor into a data format which can be stored in the register, and then provide the register with the posture information signal so that the register stores the posture information signal corresponding to the magnetic field offset of the head-worn display device, where the structure of the register can be substantially the same as in the related art in a real application, so a repeated description thereof will be omitted here.

In a particular implementation, in some embodiments of the disclosure, the geomagnetic sensor can include a magneto-resistance effect sensor, a Hall effect sensor, or a magnetic flux sensor, where a particular implementation of the geomagnetic sensor can be designed as needed in a real application environment, although some embodiments of the disclosure will not be limited thereto.

In a particular implementation, in some embodiments of the disclosure, as illustrated in FIG. 3, the signal processing circuit 222 can include an electric signal acquiring circuit 2221, an analog to digital converting circuit 2222, and a first encoding circuit 2223, where:

The electric signal acquiring circuit 2221 is configured to convert the magnetic field offset measured by the geomagnetic sensor 221 into an analog voltage electric signal;

The analog to digital converting circuit 2222 is configured to convert the analog voltage electric signal into a digital voltage signal, where the analog to digital converting circuit 2222 can include an Analog to Digital Converter (ADC), and the structure of the ADC can be substantially the same as in the related art, so a repeated description thereof will be omitted here;

The first encoding circuit 2223 is configured to convert the digital voltage signal into the posture information signal in the format corresponding to the register 223, and to provide the register 223 with the posture information signal, where, for example, the register 223 can store the parameter as a hexadecimal signal, so the first encoding circuit 2223 can convert the digital voltage signal into a corresponding hexadecimal signal, and then provide the register 223 with the hexadecimal signal so that the register 2223 can store the posture information signal corresponding to the magnetic field offset of the head-worn display device.

Figure 4:
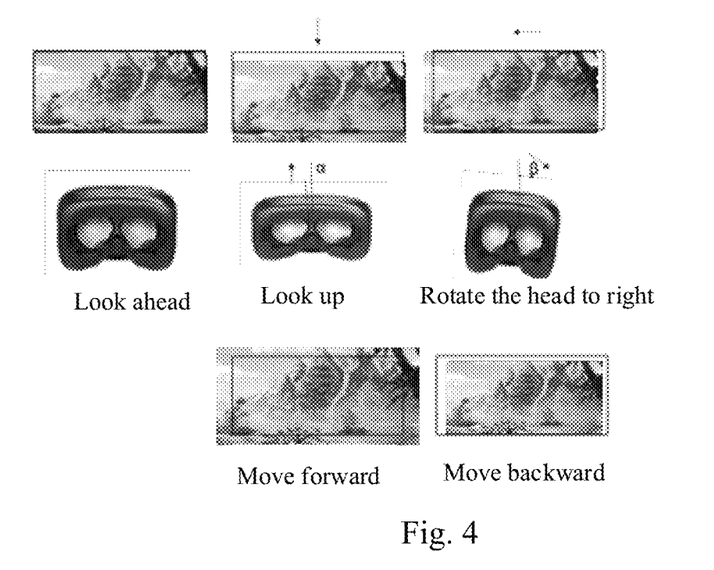
FIG. 4 is a schematic diagram of rotation directions vs. display images of the head-worn display device according to an embodiment of the disclosure.

Generally a display driving Integrated Circuit (IC) configured to drive the display panel to display an image is arranged in the display panel. In a particular implementation, in some embodiments of the disclosure, as illustrated in FIG. 3, the data processing circuit 230 can include a display driving integrated circuit 231 so that the display driving integrated circuit 231 for driving display in the display panel can be reused so that the display driving integrated circuit 231 receives the posture information signal and the display data signal, and controls the display area AA of the display panel according to the posture information signal and the display data signal to display the image corresponding to the rotation direction, where the display driving integrated circuit stores the display data signal of the image to be displayed, provided by the master processor, and the display driving integrated circuit 231 can synchronize the stored display data signal of the image to be displayed, to the posture information signal generated by the sensor circuit, particularly as illustrated in FIG. 4, where a scenario varies with the posture of the head-worn display device, e.g., Look ahead, Look down, Rotate horizontally, Rotate obliquely, Tilt forward and Elevate backward, etc. If the head-worn display device remains looking forward, then the scene will remain unchanged; if the head-worn display device looks up, then the sight of view thereof will move upward, so an upper scene will be saw; if the head-worn display device rotates rightward horizontally, then the sight of view thereof will move rightward, so a right scene will be saw; if the horizontally moves forward, then a magnified scene will be saw; if the horizontally moves backward, then a reduced scene will be saw, so that the image displayed on the display panel can appear more synchronous with the rotation direction, thus improving the experience of the user.

Furthermore the respective circuits can be embodied in an all-hardware embodiment, an all-software embodiment, or a hardware-and-software embodiment. In a particular implementation, the sensor circuit can be integrated in the display driving integrated circuit to thereby further improve the integrity of the display driving integrated circuit. Of course, the sensor circuit can be arranged separate from the display driving integrated circuit, where they are arranged functionally separate from each other, and particular physical positions of the sensor circuit and the display driving integrated circuit can be selected as needed in reality, although some embodiments of the disclosure will not be limited thereto.

Generally the display driving integrated circuit 231 can process a binary signal, and in a particular implementation, in some embodiments of the disclosure, as illustrated in FIG. 3, the data processing circuit can further include a second encoding circuit 232. The second encoding circuit 232 can be configured to receive the posture information signal generated by the sensor circuit 220, to convert the posture information signal into a posture information signal in a format corresponding to the display driving integrated circuit 231, and to provide the display driving integrated circuit 231 with the posture information signal. For example, the register 223 stores the signal as a hexadecimal posture information signal so that the second encoding circuit 232 can convert the hexadecimal posture information signal into a binary posture information signal, and then provide the display driving integrated circuit 231 with the binary posture information signal. The data processing circuit includes a data synchronization circuit configured to synchronize the posture data signal with the display data signal for driving the display panel and output a first display data signal; a data transmission circuit configured to provide the first display data signal to the display panel; a display driving circuit configured to drive the display panel to display the first display data signal. Optionally, the data synchronization circuit, the data transmission circuit and the display driving circuit are integrated in the display driving integrated chip 231.

Optionally, both the first and second encoding circuit are conventional encoder.

An operating process of the head-worn display device according to some embodiments of the disclosure will be described below with reference to FIG. 3 and FIG. 4 by way of an example in which the head-worn display device looks up from looking ahead, although some embodiments of the disclosure will not be limited thereto.

The operating process of the head-worn display device according to some embodiments of the disclosure can include the following steps:

(1) When the head-worn display device looks up from looking ahead, the geomagnetic sensor 221 arranged in the display panel 210 can measure the magnetic field offset of the head-worn display device;

(2) The electric signal acquiring circuit 2221 converts the magnetic field offset measured by the geomagnetic sensor into the analog voltage electric signal;

(3) The analog to digital converter in the analog to digital converting circuit 2222 converts the analog voltage signal into the digital voltage signal, where the analog to digital converter converts the analog voltage signal into the binary digital voltage signal;

(4) The first encoding circuit 2223 converts the digital voltage signal into the posture information signal in the format corresponding to the register, and then provides the register 223 with the posture information signal, where the first encoding circuit 2223 converts the binary digital voltage signal into the hexadecimal posture information signal, and then provides the register 223 with the hexadecimal posture information signal so that the register 223 can store the posture information signal;

(5) The register 223 stores the posture information signal output by the first encoding circuit 2223;

(6) The second encoding circuit 232 takes the first encoding circuit 2223 stored in the register 223, converts the first encoding circuit 2223 into a binary signal, and then provides the display driving integrated circuit 231 with the binary signal;

(7) The display driving integrated circuit 231 synchronizes the stored display data signal of the image to be displayed, to the posture information signal provided by the second encoding circuit 232, and thereafter controls the display area AA of the display panel 210 directly to display the image corresponding to the rotation direction so that the user sees an upper scenario above the original scenario. In this way, a period of time for the master processor to transmit the signal to the display panel, and thus a latency arising from signal transmission can be shortened so as to make the image displayed on the display panel in more synchronization with the rotation direction, thus improving the experience of the user.

Figure 5:
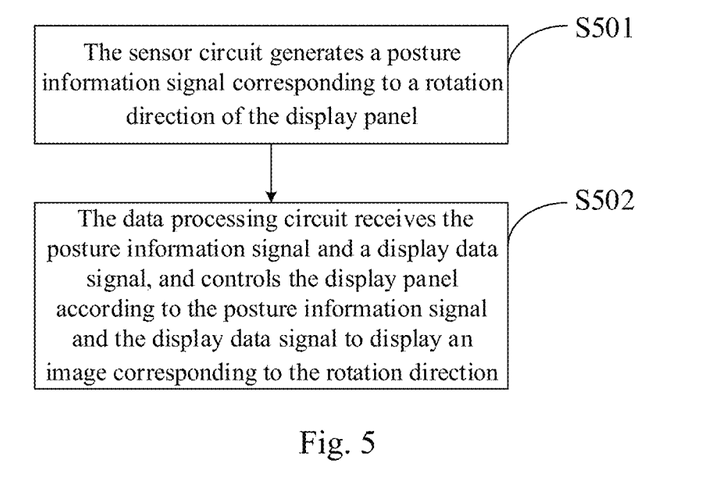
FIG. 5 is a flow chart of a driving method according to an embodiment of the disclosure.

Based upon the same inventive idea, an embodiment of the disclosure further provides a method for driving the head-worn display device according to some embodiments of the disclosure, and as illustrated in FIG. 5, the method can include the following steps:

in the step S501, the sensor circuit generates a posture information signal corresponding to a rotation direction of the display panel; and in the step S502, the data processing circuit receives the posture information signal and a display data signal, and controls the display panel according to the posture information signal and the display data signal to display an image corresponding to the rotation direction.

In the driving method according to some embodiments of the disclosure, the sensor circuit and the data processing circuit are integrated on the display panel so that the data processing circuit can control the display panel directly to display the image, thus shortening a period of time for the master processor to transmit the signal to the display panel, and thus a latency arising from signal transmission, so as to make the image displayed on the display panel in more synchronization with the rotation direction, and to improve an experience of a user.

In a particular implementation, in some embodiments of the disclosure, the step S501 can include:

the geomagnetic sensor measures a magnetic field offset of the head-worn display device;

the signal processing circuit converts the magnetic field offset measured by the geomagnetic sensor into the posture information signal in a format corresponding to the register, and then provides the register with the posture information signal; and the register stores the posture information signal output by the signal processing circuit.

In a particular implementation, in some embodiments of the disclosure, the signal processing circuit converts the magnetic field offset measured by the geomagnetic sensor into the posture information signal in the format corresponding to the register, and then provides the register with the posture information signal as follows:

the electric signal acquiring circuit converts the magnetic field offset measured by the geomagnetic sensor into an analog voltage electric signal;

the analog to digital converting circuit converts the analog voltage electric signal into a digital voltage signal; and the first encoding circuit converts the digital voltage signal into the posture information signal in the format corresponding to the register, and then provides the registers with the posture information signal.

The driving principle and a particular implementation of the method for driving the head-worn display device are the same as the principle and the implementation of the head-worn display device according to some embodiments above of the disclosure, so reference can be made to the particular implementation of the head-worn display device according to some embodiments above of the disclosure for details of the method above for driving the head-worn display device, and a repeated description thereof will be omitted here.

Figure 6:
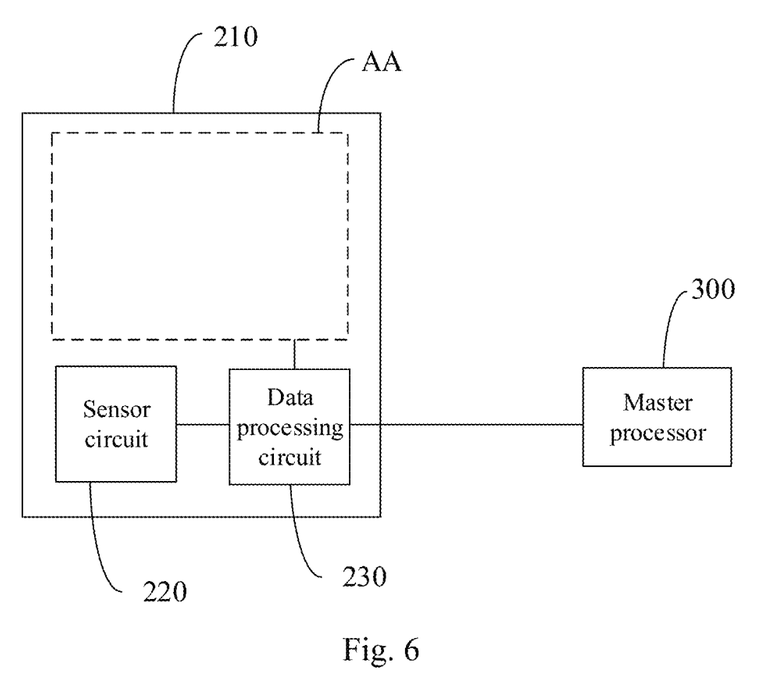
FIG. 6 is a schematic structural diagram of a virtual reality display device according to an embodiment of the disclosure.

Based upon the same inventive idea, as illustrated in FIG. 6, an embodiment of the disclosure further provides a virtual reality display device including a master processor 300, and the head-worn display device according to any one of the solutions in some embodiments of the disclosure, communicatively connected with the master processor 300, where reference can be made to the implementation of the head-worn display device above for an implementation of the head-worn display device, so a repeated description thereof will be omitted here. The master processor 300 is configured to output the display data signal to the data processing circuit 230, where the master processor 300 can process the display data signal of a frame to be displayed, in a preset scheme, and then provide the data processing circuit 230 with the display data signal.

Optionally, the master processor is arranged separate from the head-worn display device, where they are arranged functionally separate from each other, and a particular physical position of the master processor can be selected as needed in reality, and for example, the master processor can be arranged in a terminal external to the head-worn display device, although some embodiments of the disclosure will not be limited thereto.

In the virtual reality display device according to some embodiments of the disclosure, the sensor circuit and the data processing circuit are integrated on the display panel so that the data processing circuit can control the display panel directly to display the image, thus shortening a period of time for the master processor to transmit the signal to the display panel, and thus a latency arising from signal transmission, so as to make the image displayed on the display panel in more synchronization with the rotation direction, and to improve an experience of a user.

Optionally in the virtual reality display device according to some embodiments of the disclosure, the master processor can transmit data with the head-worn display device on a data line or wirelessly.

Optionally in the virtual reality display device according to some embodiments of the disclosure, the master processor can include a processor in a mobile terminal, a processor in a Personal Computer (PC) terminal, or a processor in a server (e.g., a physical server, or a server on a cloud computing resource).

In the head-worn display device, the method for driving the same, and the virtual reality display device according to the embodiments of the disclosure, the head-worn display device includes a display panel, a sensor circuit configured to generate a posture information signal corresponding to a rotation direction of the display panel, and a data processing circuit configured to receive the posture information signal and a display data signal, and to control the display panel according to the posture information signal and the display data signal to display an image corresponding to the rotation direction. Since the sensor circuit is integrated on the display panel, the sensor circuit can generate the posture information signal corresponding to the rotation direction of the display panel in a timelier manner. Furthermore the data processing circuit is integrated on the display panel, and can control the display panel directly to display the image to thereby shorten a period of time for the master processor to transmit the signal to the display panel, and thus a latency arising from signal transmission, so as to make the image displayed on the display panel in more synchronization with the rotation direction, thus improving an experience of a user.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A driving circuit for head-worn display device, comprising: a display panel driving circuit of a display panel, wherein the display panel driving circuit comprises a sensor circuit, and a data processing circuit;
  the sensor circuit is configured to generate a posture information signal corresponding to a rotation direction of the display panel; and
  the data processing circuit is configured to receive the posture information signal and a display data signal for the display panel, and to control the display panel according to the posture information signal and the display data signal to display an image corresponding to the rotation direction;
  wherein the data processing circuit comprises a display driving integrated circuit of the display panel;
  the sensor circuit comprises a geomagnetic sensor, a signal processing circuit, and a register, wherein:
  the geomagnetic sensor is configured to measure a magnetic field offset of the head-worn display device;
  the signal processing circuit is configured to convert the magnetic field offset measured by the geomagnetic sensor into a posture information signal in a format corresponding to the register, and to provide the register with the posture information signal; and
  the register is configured to store the posture information signal output by the signal processing circuit.

2. The driving circuit according to claim 1, wherein the signal processing circuit comprises an electric signal acquiring circuit, an analog to digital converting circuit, and a encoding circuit, wherein:
  the electric signal acquiring circuit is configured to convert the magnetic field offset measured by the geomagnetic sensor into an analog voltage electric signal;
  the analog to digital converting circuit is configured to convert the analog voltage electric signal into a digital voltage signal; and
  the encoding circuit is configured to encode the digital voltage signal as the posture information signal, and to provide the register with the posture information signal.

3. The driving circuit according to claim 2, further comprising a data conversion circuit configured to read the posture information signal stored by the register and convert the posture information into a posture data signal and provide the posture data signal to the data processing circuit.

4. The driving circuit according to claim 3, wherein the data processing circuit further comprises a data synchronization circuit configured to synchronize the posture data signal with the display data signal for driving the display panel and output a first display data signal;
  a data transmission circuit configured to provide the first display data signal to the display panel;
  a display driving circuit configured to drive the display panel to display the first display data signal.

5. The driving circuit according to claim 1, wherein the geomagnetic sensor comprises a magneto-resistance effect sensor, a Hall effect sensor, or a magnetic flux sensor.

6. The driving circuit according to claim 1, wherein the data processing circuit further comprises a second encoding circuit configured to receive the posture information signal generated by the sensor circuit, and to convert the posture information signal into a posture information signal in a format corresponding to the display driving integrated circuit, and to provide the display driving integrated circuit with the posture information signal.

7. The driving circuit according to claim 1, further comprising a master processor configured to output the display data signal to the data processing circuit.

8. A virtual reality display device, comprising a master processor, a display panel and the driving circuit for head-worn display device according to claim 1, communicatively connected with the master processor, wherein:
  the master processor is configured to output the display data signal to the data processing circuit.

9. The virtual reality display device according to claim 8, wherein the master processor transmits data with the driving circuit for head-worn display device in a wired or wireless manner.

10. The virtual reality display device according to claim 8, wherein the signal processing circuit comprises an electric signal acquiring circuit, an analog to digital converting circuit, and a encoding circuit, wherein:

the electric signal acquiring circuit is configured to convert the magnetic field offset measured by the geomagnetic sensor into an analog voltage electric signal;

the analog to digital converting circuit is configured to convert the analog voltage electric signal into a digital voltage signal; and the encoding circuit is configured to encode the digital voltage signal as the posture information signal, and to provide the register with the posture information signal.

11. The virtual reality display device according to claim 10, wherein the geomagnetic sensor comprises a magneto-resistance effect sensor, a Hall effect sensor, or a magnetic flux sensor.

12. The virtual reality display device according to claim 10, wherein the driving circuit further comprising a data conversion circuit configured to read the posture information signal stored by the register and convert the posture information into a posture data signal and provide the posture data signal to the data processing circuit.

13. The virtual reality display device according to claim 12, wherein the data processing circuit further comprises a data synchronization circuit configured to synchronize the posture data signal with the display data signal for driving the display panel and output a first display data signal;

a data transmission circuit configured to provide the first display data signal to the display panel;

a display driving circuit configured to drive the display panel to display the first display data signal.

14. The virtual reality display device according to claim 8, wherein the data processing circuit further comprises a second encoding circuit configured to receive the posture information signal generated by the sensor circuit, and to convert the posture information signal into a posture information signal in a format corresponding to the display driving integrated circuit, and to provide the display driving integrated circuit with the posture information signal.

* * * * *